United States Patent Office 2,718,464
Patented Sept. 20, 1955

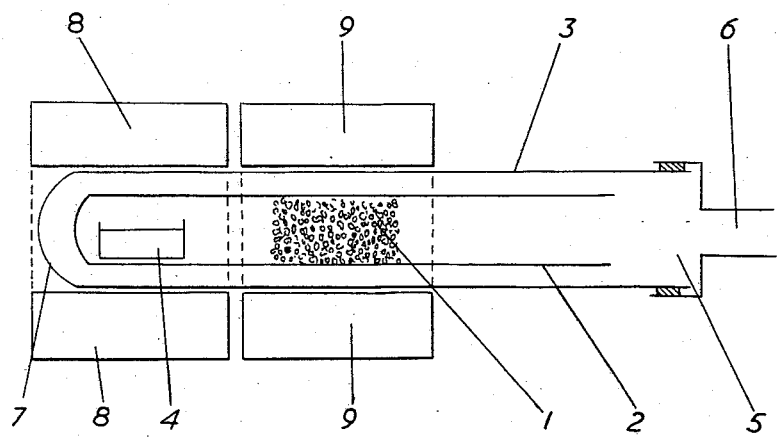

2,718,464

PRODUCTION AND PURIFICATION OF TITANIUM

Philipp Gross, Eton, and David Leon Levi, Chalfont St. Peter, England, assignors, by mesne assignments, to Almin Patents Limited, London, England Application July 24, 1952, Serial No. 300,764

The terminal portion of the term of the patent subsequent to August 19, 1969, has been disclaimed 2 Claims. (Cl. 75—84)

This invention concerns a process for the distillation of titanium. It is known that impure metallic titanium can be made by the reduction of titania (either pure, or in a naturally occurring impure form such as rutile), for example by carbon using an electric furnace. The impurities in the product, however, especially carbon, mostly as carbide, which may be present in a high proportion, and oxygen, cause it to be brittle and hence of little use in practice. Similarly, if the raw material used for the reduction by carbon or any other reducing agent contains a titaniferous ore, an impure titanium alloyed with other constituents is formed and also has properties so much inferior to those of substantially pure titanium that its usefulness in metallurgical practice is very restricted.

We have found that pure metallic titanium can be extracted from many of such impure titanium products by passing over them at elevated temperatures and preferably in a partial vacuum the vapour of a mixed alkali titanous fluoride obtained by reduction of an alkali hexafluotitanate to which some alkali fluoride may be added, thereby forming a vapour containing an alkali metal and titanous fluoride vapour and passing the vapours into a cooler zone where essentially reversal of the primary reaction occurs with deposition of pure metallic titanium and regeneration of mixed halide vapour which condenses largely separate from the bulk of the metallic titanium and may be used without purification for further extraction.

Such a mixed alkali titanous fluoride can be conveniently made by passing the vapour of an alkali hexafluotitanate to which some excess of alkali fluoride may be added, over the titanium bearing material under the conditions of the subsequent distillation reaction and condensing the vapour and separating the titanium which also distils from the halide. The mixed fluoride can also be made by reducing alkali hexafluotitanate, to which an excess of alkali fluoride may be added, at elevated temperatures in the molten state by titanium metal. The alkali (e. g. potassium) pentafluotitanite obtained by hydrogen reduction of alkali (potassium) hexafluotitanate has been found very efficient. The precise ratio of alkali fluoride to titanium trifluoride may be varied considerably care being taken to keep the alkali fluoride proportion below the limit at which condensation of free alkali metal occurs under the conditions applied, and to avoid increasing the proportion of titanium trifluoride unnecessarily. An increase in the proportion of titanium trifluoride over that contained in the pentafluotitanite gradually decreases the yield, but within a wide range the effect is relatively small. The term "mixed alkali titanous fluoride," as herein used, may therefore be defined as a fluoride mixture containing titanium trifluoride and a fluoride of an alkali metal in which the proportion of titanium trifluoride either equals or exceeds that in a double halide of tervalent titanium and alkali metal.

The method may be illustrated by considering the reactions involved when the reduction product of potassium hexafluotitanate is used as halide the equations of the reaction and its reversal are:

6 KF(vapour) + 3 TiF$_3$(vapour) + 2 Ti(solid) $\rightleftharpoons$ 5 TiF$_3$(vapour) + 6 K(vapour)

In the Gross U. S. patent application Serial No. 110,681 filed August 16, 1949, now Patent No. 2,607,675, a process for the indirect distillation of a normally non-volatile metal is described, which consists in bringing about a reaction between material containing a non-volatile metal and the gaseous halide of a volatile metal, thereby forming a mixture containing the vapours of the volatile metal and a stable halide of a non-volatile metal, followed by cooling the products to give condensates of the pure non-volatile metal and the halide of the volatile metal.

When distilling titanium according to this process of indirect distillation the vapours of chlorides, bromides and iodides of the alkali metals can be used, but when alkali fluoride vapours are led over titanium bearing material, some of the alkali metal contained in the reaction vapours, owing to the formation of double fluorides of alkali metals and of titanium, mostly in its tervalent state, condenses as free metal thus lowering the yield of titanium appreciably and having further the disadvantages inherent in the handling of alkali metals. We have however found that when evaporating a mixture of alkali fluoride and titanous fluoride, for instance of the composition of 2 mols alkali fluoride to 1 mol of titanium fluoride, and leading the vapours over heated impure titanium the titanium and halide condense to a large extent separately from each other and, due to the excess titanium trifluoride present, entirely free from any alkali metal.

The process for distilling titanium by intermediate formation of its normally stable halide from material bearing the same according to the present invention therefore consists in evaporating an alkali fluoride, either alone or mixed with titanous fluoride, contacting and reacting the fluoride vapour at elevated temperatures with the titanium bearing material, leading the vapour mixture resulting from this reaction into a cooler zone and providing in the cooler zone titanous fluoride vapour, either from the original mixture or separately introduced, in an amount at least sufficient to react with all of the alkali fluoride, thereby reconverting the vapour mixture into metallic titanium which condenses and a mixed alkali titanous fluoride.

When carrying out the process of the invention the extent of the reaction between the titanium bearing material and the halide depends on the surface area of the titanium bearing material, the rate of flow of the vapour over it and the temperature and pressure. The surface area and the flow rate are preferably regulated at such values that further increase of the surface area and decrease of the flow rate do not increase the extent of reaction appreciably in which condition equilibrium conversion is approached. Since the reaction is endothermic and proceeds with an increase in volume the conversion increases with increasing temperature and decreasing pressure. The reaction is therefore with certain advantages carried out in a partial vacuum. The increase of the reaction temperature over the evaporation temperature, i. e. using the halide for the reaction in a state in which it is relatively strongly unsaturated in respect of the condensed halide, has the advantage of improved separation of the zones of metal and halide condensation.

The accompanying drawing represents a diagrammatic sketch of one form of apparatus in which the invention may be practiced.

Suitable combinations of temperature and pressure when using the vapour of a mixed alkali titanous fluoride, according to the method of the invention may be seen from the following experiments in the description of which reference is made to the accompanying drawing. In these impure titanium 1, containing mainly carbide as impurity, in the form of small lumps of 3 to 6 mm. diameter was heated inside a refractory tube 2 or a tube made from a refractory metal for instance molybdenum. This tube was closed at one end and fitted into a mullite tube 3 also closed at one end. The halide contained in a boat 4 of a suitable refractory metal was placed inside the inner refractory tube at its closed end. The open end 5 of the outer mullite tube was kept cold and was connected by an adaptor 6 to an evacuation system. The inner refractory tube 2 when made for instance also from mullite is preferably provided with a lining which withstands the attack of the vapours present for example in a titanium sheet. However, unprotected mullite or graphite can be used since by the initial attack a protective layer is formed which very much reduces further attack of the tube material. Two-thirds of the length of the outer mullite tube adjacent to the closed end 7 could be heated by two furnaces 8 and 9. These were so positioned that the halide boat 4 and the impure metal could independently be brought to the desired temperatures by the furnaces 8 and 9, respectively, there being a smooth temperature gradient between the two furnaces. In each experiment the system was first evacuated until the pressure had dropped to less than 0.001 mm. mercury, the impure titanium was then brought to the desired temperature and finally the halide was heated.

In experiments with a mixed fluoride the mixed alkali titano-fluoride was obtained by evaporating potassium hexafluotitanate at about 950° C. and passing the vapour over the impure titanium at about 1250° C. In further extraction experiments using this mixed halide and with the temperatures of evaporation and reaction approximately as for the preparation of the mixed fluoride, the latter condensed largely separate from the titanium and could be used for further extraction. The amount of titanium distilled corresponded to about 40% of the potassium fluoride contained in the mixed fluoride having been intermediately converted into titanium trifluoride.

We claim:

1. In a process for distilling titanium from titanium bearing material wherein the titanium bearing material is contacted and reacted in one zone with a vapour of a fluoride of an alkali metal at an elevated temperature, which under the prevailing pressure is above the temperature of evaporation of the alkali metal, to produce a vapour mixture comprised of titanous fluoride and the alkali metal and the mixture is lead into a cooler zone to reverse the reaction, the improvement comprising introducing into said one zone the alkali fluoride together with titanous fluoride as a mixed alkali titanous fluoride to provide in the cooler zone titanous fluoride vapour in an amount at least sufficient to react with all of the alkali metal on reversal of the reaction to form said alkali titanous fluoride and release metallic titanium which condenses.

2. In a process for distilling titanium from titanium bearing material wherein the titanium bearing material is contacted and reacted in one zone with a vapour of a fluoride of an alkali metal at an elevated temperature, which under the prevailing pressure is above the temperature of evaporation of the alkali metal, to produce a vapour mixture comprised of stable titanous fluoride and the alkali metal and the mixture is led into a cooler zone to reverse the reaction, the improvement comprising providing in the cooler zone titanous fluoride vapour in an amount sufficient to react with all of the alkali metal, whereby the reaction on reversal produces metallic titanium which condenses and a mixed alkali titanous fluoride.

References Cited in the file of this patent

UNITED STATES PATENTS

| 2,205,854 | Kroll | June 25, 1940 |
| 2,556,763 | Maddex | June 12, 1951 |
| 2,607,675 | Gross | Aug. 19, 1952 |
| 2,621,121 | Winter | Dec. 9, 1952 |

OTHER REFERENCES

Comprehensive Treatise on Inorganic and Theoretical Chemistry by Mellor, vol. 7, pages 66–72. Published 1927 by Longmans, Green and Co., New York.

Titanium by Barksdale, published 1949 by The Ronald Press Co., New York. Pages 83–84.